Feb. 15, 1949.                    W. ARMSTRONG                    2,461,801
           APPARATUS AND METHOD FOR DETECTING AND
           MEASURING RADIANT ENERGY FOR LOCATING
                SUBTERRANEAN PETROLEUM DEPOSITS
                  Original Filed March 6, 1945
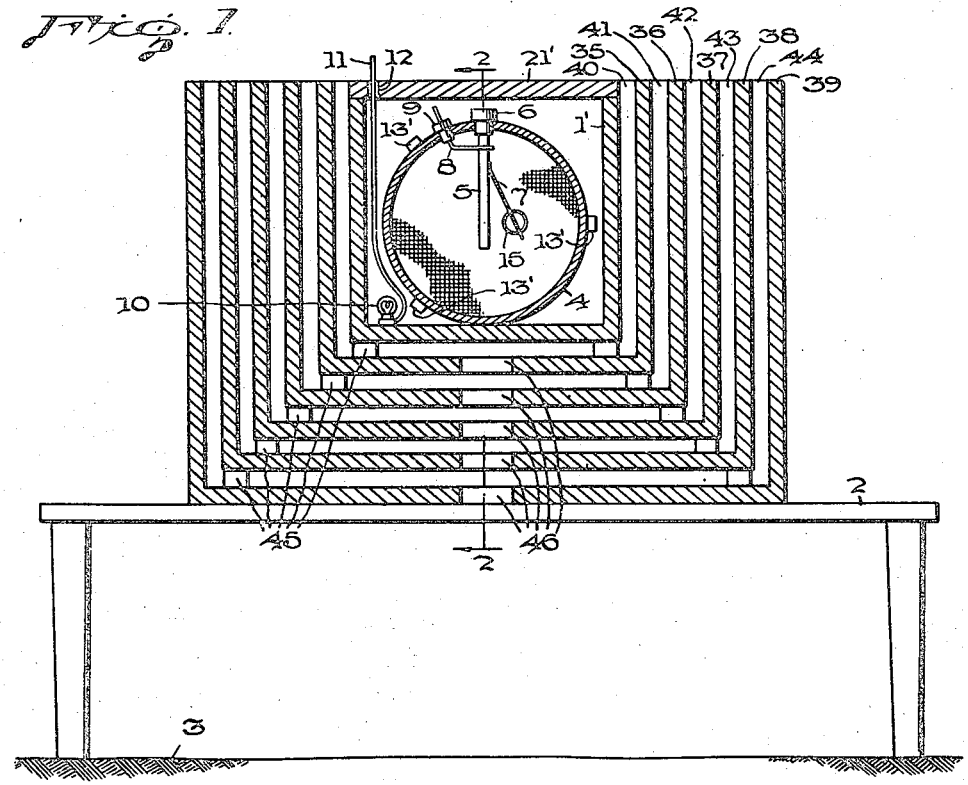
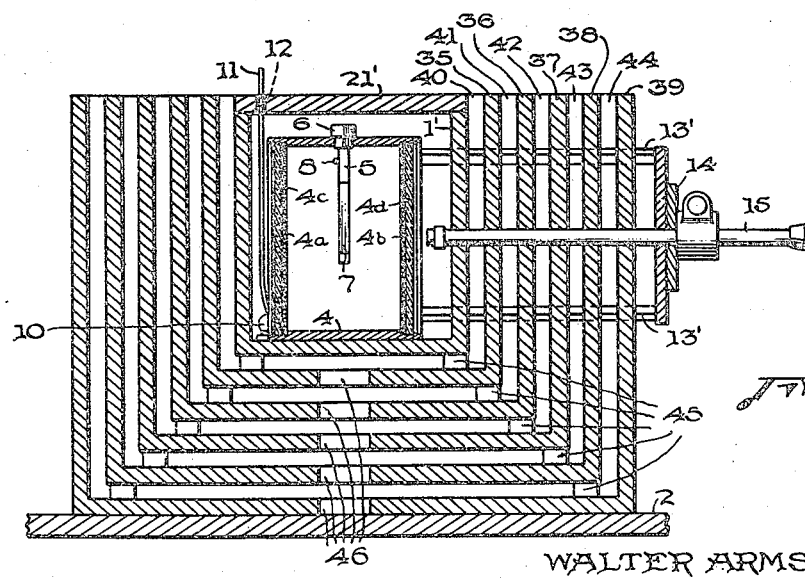
INVENTOR.
WALTER ARMSTRONG
BY
John B. Brady
ATTORNEY Patented Feb. 15, 1949

2,461,801

UNITED STATES PATENT OFFICE 2,461,801

APPARATUS AND METHOD FOR DETECTING AND MEASURING RADIANT ENERGY FOR LOCATING SUBTERRANEAN PETROLEUM DEPOSITS

Walter Armstrong, Washington, D. C.

Original application March 6, 1945, Serial No. 581,280. Divided and this application May 26, 1947, Serial No. 750,602

9 Claims. (Cl. 250—83.6)

This invention relates to the prospecting for subterranean petroleum deposits by providing apparatus and method for the detection and measurement of relative values of a penetrating radiant energy which emanates from subterranean petroleum deposits and passes through the intervening earth strata to the surface of the earth.

This application is a division of my application Serial Number 581,280 filed March 6, 1945 for "Apparatus for detecting and measuring radiant energy for locating subterranean petroleum deposits" which is a continuation-in-part of my co-pending application Serial No. 547,940 filed August 3, 1944, entitled "Method of detecting and measuring radiant energy for locating subterranean petroleum deposits."

I have found that the penetrating radiant energy emanating from subterranean petroleum deposits which reaches the earth's surface is proportional to the nature and amount of the subterranean petroleum deposit and the intervening earth strata. Because of the varied nature and intensities of this energy encountered in the various locations to be explored, various types of apparatus have been designed.

Through my construction and trial of apparatus I have learned that a negative electrostatic charge, when placed on the inner walls of a suitably shielded ionization chamber constructed of inactive material, has the property of uniting with electrons produced on the inner walls of the ionization chamber. I have also learned that when additional electrons, resulting from the penetration of external radiation to the inner walls of the shielded ionization chamber, are contacting negatively electrostatically charged inner walls, those additional electrical charges on the inner walls will produce corresponding charges of the opposite polarity, or positive charges, on the ionization chamber electrode.

These principles in the field of molecular and electron physics have been fully disclosed in my co-pending application Serial No. 547,940 filed August 3, 1944, entitled "Method of detecting and measuring radiant energy for locating subterranean petroleum deposits." My invention provides apparatus and method for utilization of the radiant energy emanating from subterranean petroleum deposits.

In my apparatus I use an ionization chamber in an inclosing shield which shields the ionization chamber from earthly ionizing radiation, such as alpha, beta, and gamma, as well as other radiation associated with the penetrating radiant energy emanating from subterranean petroleum deposits, all of which radiation accelerates the discharge of an ionization chamber charge. Surrounding the inclosing shield except on the top side and a portion of the bottom side I use a shield constructed of multiple shield members of two types in alternation, for shielding the ionization chamber against ionizing radiation encountered in geophysical explorations and the radiant energy emanating from subterranean petroleum deposits. One type is a gaseous type in which a portion of the petroleum deposit emanations is disintegrated into secondary radiation, and the other type is metallic which shield members shield the ionization chamber against the petroleum deposit emanations as well as from the secondary radiation produced in the gaseous type shield.

The radiant energy which emanates from subterranean petroleum deposits which I detect and measure by the apparatus of my invention, has penetrating properties far greater than the above-described ionizing radiation which accelerates the discharge of an ionization chamber charge, and because of the great penetrating properties of the radiant energy reaching the earth's surface from subterranean deposits of petroleum, the petroleum deposit emanations penetrate through the inclosing shield provided in my apparatus for shielding the ionization chamber from the ionizing radiation encountered in geophysical explorations that accelerates the discharge of an ionization chamber charge. The petroleum deposit emanations when penetrating the inclosing shield and on to the inner walls of the ionization chamber on which there has been placed a negative electrostatic charge, will cause electrons, or negative charges, to adhere to the negatively electrostatically charged inner walls. These added charges to the inner walls will cause a retardation in the dissipation or decay of the ionization chamber charge. Thus I have shown that the ionization chamber in my apparatus is used for the purpose of affording a shielded negatively electrostatically charged surface for collecting electrons.

The advantage of apparatus for the direct location of subterranean petroleum deposits by means of the inherent properties of the petroleum deposits is well recognized.

The principal object of my invention is to provide apparatus and method for use in the direct location of subterranean petroleum deposits by utilizing the penetrating radiant energy which emanates from subterranean petroleum deposits.

Another object of my invention is to provide a method and apparatus to reduce exploration costs and to locate new petroleum deposits or new petroleum fields whose presence may never have been suspected because of the inadequacy of present methods of petroleum prospecting.

Those and other objects of my invention will be evident from the following disclosures and the appended claims.

The method and apparatus of my invention will be more fully understood from the specification hereinafter following by reference to the accompanying drawings in which:

Figure 1 is a vertical sectional view of my exploratory apparatus embodying my invention and illustrating a multiplicity of shield members for shielding the ionization chamber against the penetrating radiant energy emanating from subterranean petroleum deposits except that radiation which passes through certain preformed and aligned apertures 46 in the multiple shields except the inclosing shield 1' which does not have an aperture; Figure 2 is a vertical sectional view of the apparatus illustrated in Fig. 1 taken substantially on line 2—2 of Fig. 1.

The ionization chamber may follow the general construction of any type of electroscope, electrometer, or other current or voltage measuring device.

The multiple shields may be of any multiple, or combination of, metallic, non-metallic, liquid, or gaseous types of construction having physical properties of shielding against radiant energy or causing the disintegration of a portion of the petroleum deposit radiant energy into secondary radiation when the petroleum deposit emanations collide with atoms in the gaseous type shields. As some examples of the metal shielding that may be used multiple or in alternation, there are pure inactive lead, aluminum, soft zinc alloy and other materials having shielding or filtering properties with respect to radiant energy. As to gaseous shields which may be used, air, hydrogen or other gases may be used multiple or in combination because of their properties in causing secondary radiations when in collision with the penetrating radiant energy which emanates from subterranean petroleum deposits or because of their shielding properties.

The figures portray an inclosing shield 1 in which there is an ionization chamber containing an insulated electrode 5 and to this electrode is fastened a strip of gold leaf. According to the accepted theory, when an electrode in an ionization chamber is given a positive electrostatic charge, a corresponding charge of the opposite polarity, or negative, is produced on the inner walls or surface of the ionization chamber. When the electrode 5 is given a positive electrostatic charge, the gold leaf strip appended thereto will extend away from the electrode and as the ionization chamber charge decays or dissipates, the gold leaf strip will fall back gradually toward the ionization chamber electrode.

When additional electrons, or negative charges, are added to the negatively electrostatically charged inner walls of the suitably shielded ionization chamber, resulting from the penetration to the ionization chamber of the radiant energy which emanates from subterranean petroleum deposits, those added charges produce corresponding positive charges on the ionization chamber electrode charge which causes a retardation in the dissipation of the electrode charge. This retardation is observed through a microscope extended through the shield members and the inclosing shield, by observing the physical fall of the gold leaf strip appended to the ionization chamber electrode during the operation of the apparatus.

The apparatus isolates the earthly ionizing radiation from the desired penetrating radiant energy emanating from subterranean petroleum deposits sufficient for operation of the apparatus, and it is this desired penetrating radiant energy that I utilize in my apparatus for petroleum exploration.

The apparatus of my invention provides multiple shielding so that the greatly varying amounts of radiation encountered in field explorations may be compensated for in order to permit operation of the ionization chamber.

Referring to Fig. 1, I have shown a diagrammatical cross section of one form of my apparatus for petroleum exploration where intense radiant energy emanating from subterranean petroleum deposits is encountered.

The apparatus may be placed on a stand or table 2 on or above the surface of the earth 3 or may be operated in excavations below the surface of the earth.

In Fig. 1 the inclosing shield 1', which is diagrammatically represented, is constructed of pure inactive lead of the single metal type, in other words pure inactive lead. This lead metal shields the ionization chamber 4 from the ionizing radiation incident upon the inclosing shield 1', which radiation accelerates the dissipation of an ionization chamber charge. The capacity of the lead used to shield radiant energy from the ionization chamber depends upon its thickness and quality, and as the amount of such ionizing radiation to be shielded from the ionization chamber 4 in petroleum explorations is dependent upon the radiation encountered in the particular territory to be explored, the inclosing shield 1' may vary in its thickness or shielding capacity and still come within the scope and sphere of my invention.

Resting on the bottom side of the inclosing shield 1' is an electroscope type of ionization chamber 4 which may be constructed, for example, of brass or other suitable metal tubing with a meshed wire screen of brass or other suitable material 4a and 4b rear and front, backed by glass 4c and 4d to permit viewing the ionization chamber 4 through the front side and permitting light for observation purposes to enter from the rear. The meshed wire screen serves the purpose of dissipating any charge tending to accumulate on the glass surface when the apparatus is in use. The inclosing shield 1' shields the ionization chamber 4 on all sides from the earthly ionizing radiation.

In the type of ionization chamber shown in Figs. 1 and 2, an electrode 5 of brass or other suitable material extends axially into the ionization chamber 4 and is held in place and insulated from the walls of the ionization chamber 4 by insulator 6 and appended to the electrode 5 is a strip of gold leaf 7.

In field operation the shielded ionization chamber electrode 5 is given a positive electrostatic charge that extends the gold leaf strip 7 away from the electrode 5. The electrode 5 is given this positive electrostatic charge by means of manually contacting the positively electrostatically charged wire 8 to the electrode 5. The charged wire 8 passes through an insulator 9 in the walls of the ionization chamber 4. The positive electrostatic charge is placed on the wire 8 by contacting the wire 8 to a charging unit outside of the apparatus and the wire 8 is disconnected from the charging unit after the electrode 5 has been given the desired charge. The desired charge depends upon the size and construction of the ionization chamber 4. To place a positive electrostatic charge on the ionization chamber electrode 5, part 21' of the inclosing shield 1' over the ionization chamber 4 is removed and after the electrode 5 has been given the desired number of electrostatic units charge to permit the gold leaf strip 7 to be viewed through a microscope 15 affixed at right angles to the gold leaf strip 7, the wire 8 is turned to the front or rear side of the ionization chamber 4 and made to contact the meshed wire screen 4a adjacent to the glass facing 4c at the rear or the meshed wire screen 4b adjacent to the glass facing 4d at the front of the iorization chamber 4 and part 21' of the inclosing shield 1' over the ionization chamber 4 is put back in place.

To provide light for observation of the movement of the gold leaf strip 7 through the microscope 15 affixed to the ionization chamber 4 at right angles to the gold leaf strip 7, a battery light 10 is placed inside the inclosing shield 1'. Electricity for the light 10 is supplied from an external source by means of the insulated duplex wire 11 passing through opening 12 in the top of the inclosing shield 1'.

The ionization chamber 4 is further shielded against earthly radiant energy on the sides and bottom by a multiplicity of spacially related shields. In the type of apparatus employing multiple shielding portrayed in Fig. 1, lead shields 35, 36, 37, 38 and 39 with aligned apertures 46 therein separated by air shields 40, 41, 42, 43 and 44, surround the ionization chamber 4 on all sides except the top side, while the inclosing shield 1' surrounds the ionization chamber on all sides. The inclosing shield 1' and shields 35, 36, 37, 38 and 39 are made from pure inactive lead. However, for metal shields, aluminum, soft zinc alloys and other metals having shielding or filtering properties with respect to radiant energy may be used; and instead of the air shields 40, 41, 42, 43 and 44, hydrogen or other gases may be used. Separating the metal shields 1', 35, 36, 37, 38 and 39 are strips 45 of insulation material to spacially relate the shields. Any method of alternation or combination of metal, gaseous or liquid shielding, when used for the purpose of shielding from a negatively electrostatically charged surface the penetrating radiant energy which emanates from subterranean petroleum deposits, comes within the scope and sphere of my invention.

The principle embodied in multiple shielding is to provide shields having shielding and disintegrating properties sufficient to shield the ionization chamber 4 against the radiant energy reaching the apparatus from subterranean petroleum deposits except from a desired direction and in Fig. 1 the direction shown is vertical.

In this apparatus the apertures 46, aligned between the ionization chamber 4 and the earth's surface 3, are made in shields 35, 36, 37, 38 and 39, through which radiant energy emanating from subterranean petroleum deposits will pass and penetrate the inclosing shield 1' and on to the ionization chamber 4 where this energy is detected and measured for utilization in petroleum explorations. In my apparatus I normally use an aperture of two inches. Any size aperture may be used; however, the size of the aperture used controls the size of the projected area of the subterranean petroleum deposit from which radiation will reach the ionization chamber 4, and of course, sufficient radiation from the subterranean petroleum deposit or deposits must reach the ionization chamber 4 to permit its detection and measurement, therefore apparatus constructed with any size apertures may be used and come within the scope and sphere of my invention.

As the intensity of the radiant energy emanating from subterranean petroleum deposits varies greatly, the multiplicity of shields used may also vary according to the needs of the exploration and still come within the scope and sphere of my invention. Apparatus of this type of construction serves such purposes as providing the means for detections and measurements of radiant energy emanating from subterranean petroleum deposits for ascertaining the proper location for drilling operations in an already heavily producing oil field or when locating new petroleum deposits from which extreme radiation is encountered. The multiplicity of shields compensates for the intense radiation encountered in order to permit dissipation of an ionization chamber charge within a reasonable period of time.

Disintegration of a portion of the radiant energy reaching the earth's surface from the subterranean petroleum deposits occurs when it contacts the atoms in the earth's atmosphere. The radiant energy emanations from subterranean petroleum deposits will contact the metal shield 39 on the bottom or on the sides or both depending on the location of the petroleum deposit. Shield 39, except the aperture 46 shields the ionization chamber 4 from the secondary or ionizing radiation produced by the petroleum deposit radiant energy contacting the atoms in the earth's atmosphere up to reaching shield 39. Shield 39 also shields the ionization chamber 4 against a portion of the radiant energy emanating from the subterranean petroleum deposit. The petroleum deposit radiant energy that penetrates through shield 39 will then contact the atoms in the air shield 44 which will produce secondary radiations, which secondary radiations will be shielded from the ionization chamber 4 by shield 38. Shield 38 will shield from the ionization chamber 4 a portion of the petroleum deposit radiant energy that penetrated through shields 39 and 44. The petroleum deposit radiant energy that penetrates through the metal shield 38 will similarly produce secondary radiations in its penetration of air shield 43 which secondary radiations will be shielded from the ionization chamber 4 by the metal shield 37. And again shield 37 will shield from the ionization chamber 4 a portion of the petroleum deposit radiant energy that has penetrated shields 39, 44, 38 and 43.

By this progressive method of shielding through successive metal shields 37, 36, 35 and the inclosing shield 1' as well as the progressive production of secondary radiations in air shields 42, 41 and 40, and the shielding of those secondary radiations from the ionization chamber 4 by the metal shields, the ionization chamber 4 is shielded against the petroleum deposit emanations except that petroleum deposit radiant energy which will pass through the aligned apertures 46 and penetrate the inclosing shield 1' and on to the ionization chamber 4. The secondary radiations that pass through the apertures 46 will be shielded from the ionization chamber 4 by the inclosing shield 1'.

The multiple shields 35, 36, 37, 38, 39, 40, 41, 42, 43 and 44 therefore serve the purpose of shielding the ionization chamber 4 against the penetrating radiant energy emanating from subterranean petroleum deposits except that radiant energy which passes through the apertures 46. Multiple shielding is not provided above the inclosing shield 1' above the ionization chamber 4 because no radiant energy emanating from subterranean petroleum deposits is encountered on that side. As many shields as are necessary in the particular exploration may be used in order to obtain dissipation of the ionization chamber charge within a reasonable time period.

In Fig. 2 the ionization chamber 4 is completely surrounded by the inclosing shield 1' and shielded on the sides and bottom by shields 35, 36, 37, 38, 39, 40, 41, 42, 43 and 44, except that through the bottom shields 35, 36, 37, 38 and 39 there are apertures or openings, aligned one above the other between the ionization chamber 4 and the earth's surface 3, through which the penetrating radiant energy from subterranean petroleum deposits passes. The microscope 15 for observing the physical movement of the gold leaf strip 7 appended to the electrode 5 in ionization chamber 4, is affixed to the ionization chamber 4 by means of metal strip fasteners 13' extending through the inclosing shield 1' and the multiple shields to an adjusting frame 14 in which the microscope 15 may be positioned as desired. The microscope 15 also extends through the multiple shields and through an opening in the inclosing shield 1'.

Before engaging in field exploration work with this type of apparatus the normal rate of dissipation of a positive electrostatic charge on the ionization chamber electrode 5 in the chamber 4 when shielded against earthly radiant energy at point of exploration is determined.

In field operation work at selected locations in the territory to be explored, the surface of the inner walls of the ionization chamber 4 is given a negative electrostatic charge by manually placing a positive electrostatic charge on the electrode 5 which extends the gold leaf strip 7 away from the electrode 5, and the apparatus is then subjected to the radiant energy emanating from subterranean petroleum deposits, and any such radiant energy encountered will pass through the apertures 46 and penetrate the inclosing shield 1' and on to the ionization chamber 4 and cause negative charges, or electrons, to be added to the already negatively electrostatically charged inner walls of the ionization chamber 4 which will produce corresponding positive charges on the ionization chamber electrode 5 which charges are detected and measured by observing the change of the electrode charge through the microscope 15 and comparing that change of charge with the normal rate of dissipation or decay of an electrode charge. Any retardation determined evidences the presence and the amount of such retardation evidences the relative value of the extent or amount of the radiant energy emanations encountered from the projected area of the subterranean petroleum deposit.

In the foregoing description and explanation of the apparatus and method of my invention, I have utilized certain specific forms of construction to more clearly explain the principles upon which it operates, and to so fully describe some possible forms of my invention that construction and proper use of the apparatus will effectively demonstrate the theory, the use, and the utility of my invention.

It is emphatically stated that all metals used in the construction of the apparatus described in this application must be pure, inactive and absolutely free from any entrapped energy or bound electrical charges.

Obviously many other modifications and variations of the invention as hereinabove set forth may be made without departing from the spirit and scope thereof, and therefore only such limitations should be imposed as are indicated by the appended claims.

What I claim and desire to secure by Letters Patent of the United States is as follows:

1. Apparatus for detecting radiant energy emanating from subterranean petroleum deposits encountered in geophysical explorations for locating subterranean petroleum deposits, comprising an ionization chamber; an inclosing shield substantially impervious to earthly ionizing radiation incident upon said inclosing shield surrounding said chamber; two types of additional shields in alternation around the sides and bottom of said chamber, one of said types of shields being a gaseous shield for the disintegration of a portion of the radiant energy emanating from subterranean deposits of petroleum incident upon said shield and the other of said types of shields being a metallic shield for shielding the ionization chamber against earthly ionizing radiation and the radiant energy emanating from subterranean petroleum deposits except for a portion of said metallic shield between the ionization chamber and the earth's surface; and means for measuring the change in the ionization chamber charge during the operation of the apparatus.

2. Apparatus for detecting radiant energy emanating from subterranean petroleum deposits encountered in geophysical explorations for locating subterranean petroleum deposits, comprising an ionization chamber with an electrode extending therein; an inclosing shield substantially impervious to earthly ionizing radiation incident upon said inclosing shield surrounding said chamber; two types of additional shields in alternation around the sides and bottom of said chamber, one of said types of shields being a gaseous shield for the disintegration of a portion of the radiant energy emanating from subterranean deposits of petroleum incident upon said shield and the other of said types of shields being a metallic shield for shielding the ionization chamber against earthly ionizing radiation and the radiant energy emanating from subterranean petroleum deposits except for a portion of said metallic shield between the ionization chamber and the earth's surface; and a microscope for determining the relative amount of petroleum deposit emanations encountered from a limited area of the earth's substrata.

3. A method of detecting subterranean petroleum deposit emanations that comprises surrounding an ionization chamber with an inclosing shield against earthly ionizing radiation incident upon said shield; surrounding the sides and bottom of said chamber with two types of additional shields in alternation, one of said types of shields being a gaseous shield for the disintegration of a portion of the radiant energy emanating from subterranean petroleum deposits by collision with atoms in said shield and the other of said types of shields being a metallic shield shielding the ionization chamber against the ionizing radiation produced in the gaseous shield and against earthly radiant energy except for a portion of said metallic shield between the ionization chamber and the earth's surface with the excepted portion providing passage for the petroleum deposit emanations to the inclosing shield; charging positively electrostatically an electrode in said chamber; subjecting said shielded chamber to the radiant energy emanating from subterranean petroleum deposits; determining the rate of dissipation of the electrode charge; and comparing that rate of dissipation with the rate of dissipation of a similar positive electrostatic charge on the electrode when shielded against radiant energy emanating from subterranean petroleum deposits, the presence of petroleum deposit emanations encountered from a limited area of the earth's substrata being detected thereby.

4. A method of measuring radiant energy for the relative amount of subterranean petroleum deposit emanations encountered in geophysical explorations that comprises surrounding an ionization chamber with an inclosing shield against earthly ionizing radiation incident upon said shield; surrounding the sides and bottom of said chamber with two types of additional shields in alternation, one of said types of shields being a gaseous shield for the disintegration of a portion of the radiant energy emanating from subterranean petroleum deposits by collision with atoms in said shield and the other of said types of shields being a metallic shield shielding the ionization chamber against the ionizing radiation produced in the gaseous shield and against earthly radiant energy except for a portion of said metallic shield between the ionization chamber and the earth's surface with the excepted portion providing passage for the petroleum deposit emanations to the inclosing shield; charging positively electrostatically an electrode in said chamber; subjecting said shielded chamber to the radiant energy emanating from subterranean petroleum deposits; determining the change of charge on the electrode; and comparing that change of charge on the electrode with the change of a similar positive electrostatic charge on the electrode when shielded against radiant energy emanating from subterranean petroleum deposits, the relative amount of petroleum deposit emanations encountered from a limited area of the earth's substrata being measured thereby.

5. A method of detecting radiant energy for the presence of subterranean petroleum deposits that comprises surrounding an ionization chamber with an inclosing shield against earthly ionizing radiation incident upon said shield; surrounding the sides and bottom of said chamber with two types of additional shields in alternation, one of said types of shields being a gaseous shield for the disintegration of a portion of the radiant energy emanating from subterranean petroleum deposits by collision with atoms in said shield and the other of said types of shields being a metallic shield shielding the ionization chamber against the ionizing radiation produced in the gaseous shield and against earthly radiant energy except for a portion of said metallic shield between the ionization chamber and the earth's surface with the excepted portion providing passage for the petroleum deposit emanations to the inclosing shield; charging negatively electrostatically the inner surface of said chamber; subjecting said shielded chamber to the radiant energy emanating from subterranean petroleum deposits; determining the rate of dissipation of the charge on the inner surface of the ionization chamber; and comparing that rate of dissipation with the rate of dissipation of a similar negative electrostatic charge on the inner surface of the ionization chamber when shielded against radiant energy emanating from subterranean petroleum deposits, the presence of subterranean petroleum deposit emanations encountered from a limited area of the earth's substrata being detected thereby.

6. A method of measuring radiant energy for the relative amount of subterranean petroleum deposit emanations encountered in geophysical explorations that comprises surrounding an ionization chamber with an inclosing shield against earthly ionizing radiation incident upon said shield; surrounding the sides and bottom of said chamber with two types of additional shields in alternation, one of said types of shields being a gaseous shield for the disintegration of a portion of the radiant energy emanating from subterranean petroleum deposits by collision with atoms in said shield and the other of said types of shields being a metallic shield shielding the ionization chamber against the ionizing radiation created in the gaseous shield and against earthly radiant energy except for a portion of said metallic shield between the ionization chamber and the earth's surface with the excepted portion providing passage for the petroleum deposit emanations to the inclosing shield; charging negatively electrostatically the inner surface of said chamber; subjecting said shielded chamber to the radiant energy emanating from subterranean petroleum deposits; determining the change of charge on the inner surface of the ionization chamber; and comparing that change of charge with the change of a similar negative electrostatic charge on the inner surface of the ionization chamber when shielded against radiant energy emanating from subterranean petroleum deposits, the relative amount of petroleum deposit emanations encountered from a limited area of the earth's substrata being measured thereby.

7. Apparatus for detecting radiant energy emanating from subterranean petroleum deposits encountered in geophysical explorations, comprising an ionization chamber, shielding substantially impervious to earthly ionizing radiation incident upon said shielding surrounding said chamber, additional shielding around the sides and bottom of said chamber except for a portion of the bottom shielding for shielding said chamber against earthly radiant energy with the excepted portion providing passage for petroleum deposit emanations to the ionization chamber, and means for measuring the change in the ionization chamber charge.

8. A method of measuring radiant energy for the relative amount of subterranean petroleum deposit emanations encountered in geophysical explorations comprising surrounding an ionization chamber with shielding against earthly ionizing radiation incident upon said shielding, surrounding said ionization chamber on the sides and on the bottom with additional shielding against earthly radiant energy except for a portion of said bottom shielding between the ionization chamber and the earth's surface, charging negatively electrostatically the inner surface of the ionization chamber, subjecting said shielded chamber to the radiant energy emanating from subterranean petroleum deposits, determining the change of charge on the inner surface of the ionization chamber, and comparing that change of charge with the change of a similar negative electrostatic charge on the inner surface of said chamber when shielded against the radiant energy emanating from subterranean petroleum deposits, the relative amount of petroleum deposit emanations encountered from a limited area of the earth's substrata being measured thereby.

9. Apparatus for detecting radiant energy emanating from subterranean petroleum deposits encountered in geophysical explorations for locating subterranean petroleum deposits, comprising an ionization chamber; an inclosing shield substantially impervious to earthly ionizing radiation incident upon said inclosing shield surrounding said chamber; two types of additional shielding in alternation around the sides and bottom of said chamber for shielding said chamber against earthly radiant energy except for a portion of said additional shielding between the ionization chamber and the earth's surface, one of said types of shielding being a gaseous shield and the other of said types of shielding being a metallic shield; and means for measuring the change in the ionization chamber charge during the operation of the apparatus.

WALTER ARMSTRONG.

REFERENCES CITED

The following references are of record in the file of this patent:

UNITED STATES PATENTS

| Number | Name | Date |
| --- | --- | --- |
| 1,815,921 | Lapof | July 28, 1931 |
| 1,929,177 | Nelson | Oct. 3, 1933 |
| 1,933,063 | Kolhorster | Oct. 31, 1933 |
| 2,285,840 | Scherbatskoy | June 9, 1942 |
| 2,296,176 | Neufeld | Sept. 15, 1942 |
| 2,316,361 | Piety | Apr. 13, 1943 |

OTHER REFERENCES

Radiology, vol. 27, 1936, p. 152.